(12) United States Patent
Holton

(10) Patent No.: US 11,693,823 B2
(45) Date of Patent: Jul. 4, 2023

(54) FILE DECAY PROPERTY

(71) Applicant: ADP, INC., Roseland, NJ (US)

(72) Inventor: Donald Holton, Atlanta, GA (US)

(73) Assignee: ADP, INC., Roseland, NJ (US)

( * ) Notice: Subject to any disclaimer, the term of this patent is extended or adjusted under 35 U.S.C. 154(b) by 283 days.

(21) Appl. No.: 16/896,892

(22) Filed: Jun. 9, 2020

(65) Prior Publication Data

US 2021/0382849 A1    Dec. 9, 2021

(51) Int. Cl.
| | |
|---|---|
| *G06F 3/00* | (2006.01) |
| *G06F 9/00* | (2006.01) |
| *G06F 17/00* | (2019.01) |
| *G06F 16/16* | (2019.01) |
| *G06F 3/04817* | (2022.01) |
| *G06F 3/04847* | (2022.01) |
| *G06F 3/04842* | (2022.01) |

(52) U.S. Cl.
CPC ........ *G06F 16/162* (2019.01); *G06F 3/04817* (2013.01); *G06F 3/04847* (2013.01); *G06F 3/04842* (2013.01)

(58) Field of Classification Search
CPC ............... G06F 16/162; G06F 3/04847; G06F 3/04817; G06F 3/0484
See application file for complete search history.

(56) References Cited

U.S. PATENT DOCUMENTS

| | | | |
|---|---|---|---|
| 7,680,830 B1 | 3/2010 | Ohr et al. | |
| 2007/0011622 A1 | 1/2007 | Chae et al. | |
| 2007/0094335 A1* | 4/2007 | Tu | H04L 67/125 |
| | | | 709/206 |
| 2010/0293201 A1* | 11/2010 | Thergaonkar | G06F 8/65 |
| | | | 707/803 |
| 2016/0057029 A1* | 2/2016 | Iida | G05B 15/02 |
| | | | 709/224 |

OTHER PUBLICATIONS

"Schedule files for deletion", Corel Corporation, Sep. 11, 2019, http://kb.winzip.com/kb/entry/408, 5 pages.
"Box: Auto-Delete a File or Folder", University of Minnesota, Sep. 25, 2019, https://it.umn.edu/box-auto-delete-file-or-folder, 6 pages.

* cited by examiner

*Primary Examiner* — Kieu D Vu
*Assistant Examiner* — Anita D Chaudhuri
(74) *Attorney, Agent, or Firm* — Foley & Lardner LLP

(57) ABSTRACT

A computer-implemented method, computer system, and computer program product for deleting a file from a storage medium. A file that is marked for automatic deletion is identified. A deletion time at which the file is to be deleted from the storage medium is identified. A visual indicator associated with the file is displayed. The visual indicator changes over time to provide an indication as to a nearness of the deletion time.

20 Claims, 10 Drawing Sheets

| Junk | | | | | |
|---|---|---|---|---|---|
| | | | | Graphic | Search |
| Name | | Date Modified | ∨ | Size | |
| ADP_Health_Compliance_ACA_IRS_Reporting - unlocked - do not distribute.pdf | | Jun 7, 2019 at 4:12 PM | | 56.7 MB | |
| Pages from Roadshow Sales Document.pdf | | Jun 7, 2019 at 11:20 AM | | 389 KB | |
| ADP_Health_Compliance_ACA_IRS_Reporting.docx | | Jun 6, 2019 at 7:55 PM | | 48.5 MB | |
| Pages from Roadshow Sales Document - 2.pdf | | Jun 6, 2019 at 10:31 AM | | 233 KB | |
| Roadshow Sales Document.pdf | | Jun 5, 2019 at 5:15 PM | | 7.3 MB | |
| Pages From Penalty_Management_for_Employer Shared_Responsibility.pdf | | May 29, 2019 at 8:20 AM | | 955 KB | |
| Slide.pptx | | May 21, 2019 at 11:03 PM | | 13.4 MB | |
| Amanda-a.ai | | May 21, 2019 at 2:17 PM | | 1.8 MB | |
| Amanda-a_who-what-when.png | | May 21, 2019 at 2:16 PM | | 2.7 MB | |
| Amanda-a_messaging 1.png | | May 21, 2019 at 2:16 PM | | 22 KB | |
| Amanda-a_HCR Data Model.png | | May 21, 2019 at 2:16 PM | | 239 KB | |
| Amanda-B.ai | | May 21, 2019 at 2:12 PM | | 1.7 MB | |

Junk

| Name | Date Modified | Size |
|---|---|---|
| Pages from Roadshow Sales Document.pdf | Jun 7, 2019 at 11:20 AM | 389 KB |
| ADP_Health_Compliance_ACA_IRS_Reporting.docx | Jun 6, 2019 at 7:55 PM | 48.5 MB |
| Pages from Roadshow Sales Document - 2.pdf | Jun 6, 2019 at 10:31 AM | 233 KB |
| Roadshow Sales Document.pdf | Jun 5, 2019 at 5:15 PM | 7.3 MB |
| Pages From Penalty_Management_for_Employer Shared_Responsibility.pdf | May 29, 2019 at 8:20 AM | 955 KB |
| Slide.pptx | May 21, 2019 at 11:03 PM | 13.4 MB |
| Amanda-a.ai | May 21, 2019 at 2:17 PM | 1.8 MB |
| Amanda-a_who-what-when.png | May 21, 2019 at 2:16 PM | 2.7 MB |
| Amanda-a_messaging 1.png | May 21, 2019 at 2:16 PM | 22 KB |
| Amanda-a_HCR Data Model.png | May 21, 2019 at 2:16 PM | 239 KB |
| Amanda-B.ai | May 21, 2019 at 2:12 PM | 1.7 MB |
| night chart.pdf | May 20, 2019 at 10:16 PM | 792 KB |

900

504

FILE DECAY PROPERTY

BACKGROUND INFORMATION

1. Field

The present disclosure relates generally to an improved computer system and, in particular, to managing electronic files in a computer system. More particularly, the present disclosure relates to establishing deletion times for electronic files, automatically deleting electronic files, and providing visual indicators for electronic files that are to be automatically deleted.

2. Background

The accumulation of unneeded files on a computer is a perennial problem. Many unneeded files stored on a computer take up storage space and may have an adverse effect on computer performance. Furthermore, the computer workspace view, that is, the computer desktop or window in which the files on the computer are listed, may become cluttered with many files, including files that are no longer needed along with files that are still being used, thereby making it more difficult for a user to locate a file that is needed. Removing unneeded files from a computer can be problematic, as a user may not be able to distinguish easily between needed files and unneeded files that may be deleted, based on the file names and other metadata in the computer workspace view alone.

An example of a situation in which unneeded files may accumulate on a computer is in a collaborative working environment. In collaborative working environments, many different users may perform tasks on a project and therefore require access to electronic project files. For example, one user may perform work with or on a computer file or data while a second user performs other tasks with the same data or with the output or work product of the first user. Many times, users receive or download files to their individual computers to make working with or on the files more convenient and to avoid work interruptions when network access becomes unavailable or slow. Some of these downloaded files are temporary files that the user needs only for a certain period of time in order to perform their job function. For example, such temporary files may need to be stored for longer than a few hours or days, but need not be stored permanently. A user in a collaborative working environment may work on many different projects using many different temporary files over a period of time. The user easily may forget which downloaded files are no longer needed, leading to the accumulation of many files that take up space on the computer but that are no longer needed.

Therefore, a system for more effective and efficient management of files on a computer is desirable.

SUMMARY

An illustrative embodiment provides a computer-implemented method for automatically deleting a file from a storage medium. A computer system identifies a file that is marked for automatic deletion. The computer system identifies a deletion time at which the file is to be automatically deleted from the storage medium. The computer system displays a visual indicator associated with the file. The visual indicator changes over time to provide an indication of nearness of the deletion time.

Another illustrative embodiment provides a computer system for automatically deleting a file. The computer system includes a storage medium configured to store the file, a display system, and a processor unit. The processor unit is configured to identify the file that is marked for automatic deletion from the storage medium, identify a deletion time at which the file is to be automatically deleted from the storage medium, and display a visual indicator associated with the file on the display system. The visual indicator changes over time to provide an indication of nearness of the deletion time.

Yet another illustrative embodiment provides a computer program product for automatically deleting a file. The computer program product comprises a computer readable storage media having program instructions embodied therewith. The program instructions are executable by a computer to cause the computer to perform a method of: identifying the file that is marked for automatic deletion from a storage medium, identifying a deletion time at which the file is to be automatically deleted from the storage medium, and displaying a visual indicator associated with the file. The visual indicator changes over time to provide an indication of nearness of the deletion time.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIGS. 5-9 are examples of displays illustrating the changing appearance of a visual indicator for a file to be automatically deleted as the deletion time for the automatic deletion of the file approaches in accordance with an illustrative embodiment.

DETAILED DESCRIPTION

Figure 1:
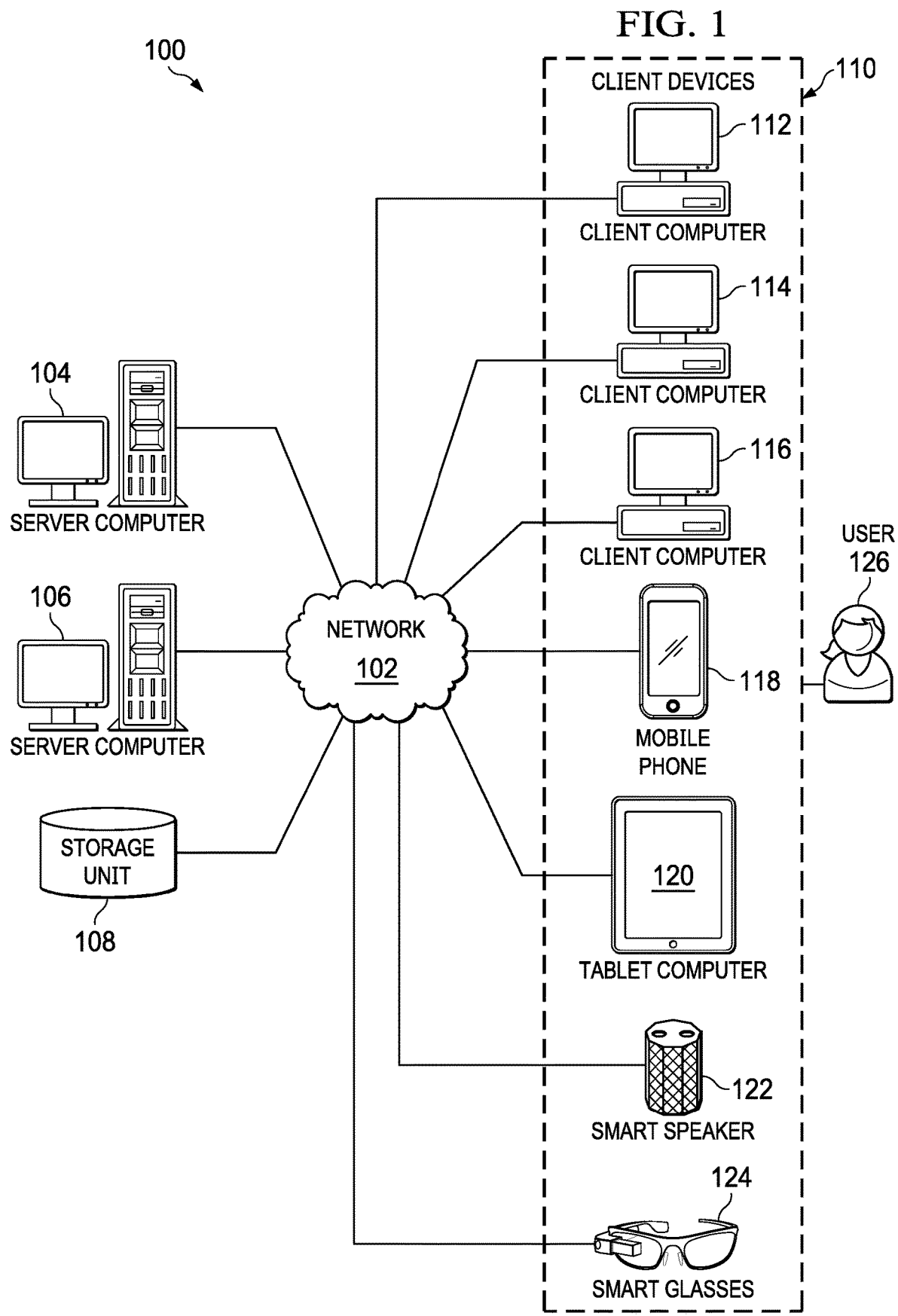
FIG. 1 is a block diagram of an information environment depicted in accordance with an illustrative embodiment.

The illustrative embodiments recognize and take into account one or more different considerations. For example, the illustrative embodiments recognize and take into account that users often receive computer readable files for use on their computer. These files may need to be stored temporarily, so that the user may use the files to perform various tasks. However, many such files do not need to be stored permanently, and should be deleted from the computer after use.

The illustrative embodiments further recognize and take into account that users often forget to delete unneeded files when they are finished using them. Users often receive many such files, and many files that are no longer needed can accumulate on the computer. These files take up storage space on the computer that may be needed for other items. Furthermore, the file names or other visual indicators corresponding to these unneeded files may clutter the computer desktop view or other file view, making it more difficult for the user to locate a specific file when needed.

The illustrative embodiments provide methods, systems, and computer program products for automatically deleting computer files after the expiration of a user configurable time period. The illustrative embodiments provide the user with a visual indicator of the nearness of the deletion time for a particular file. For example, in some illustrative embodiments, the file name or other visual indicator of the file is made more transparent as the nearness of the deletion time for the file approaches. The user is thereby reminded when a file is to be automatically deleted soon, giving the user an opportunity to modify the automatic deletion time for the file or remark the file to not be automatically deleted if the user has not finished using the file.

Illustrative embodiments may be a system, a method, and/or a computer program product at any possible technical detail level of integration. The computer program product may include a computer readable storage medium (or media) having computer readable program instructions thereon for causing a processor to carry out aspects of the illustrative embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the illustrative embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the illustrative embodiments.

Aspects of the illustrative embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus, to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various illustrative embodiments. In this regard, each block in the flowcharts or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems or combinations of special purpose hardware and computer instructions that perform the specified functions or acts.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. Client devices 110 can be, for example, computers, workstations, or network computers. As depicted, client devices 110 include client computer 112, client computer 114, and client computer 116. Further, client devices 110 can also include other types of devices, such mobile phone 118, tablet computer 120, smart speaker 122, and smart glasses 124. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). Network 102 may be comprised of the Internet-of-Things (IoT). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
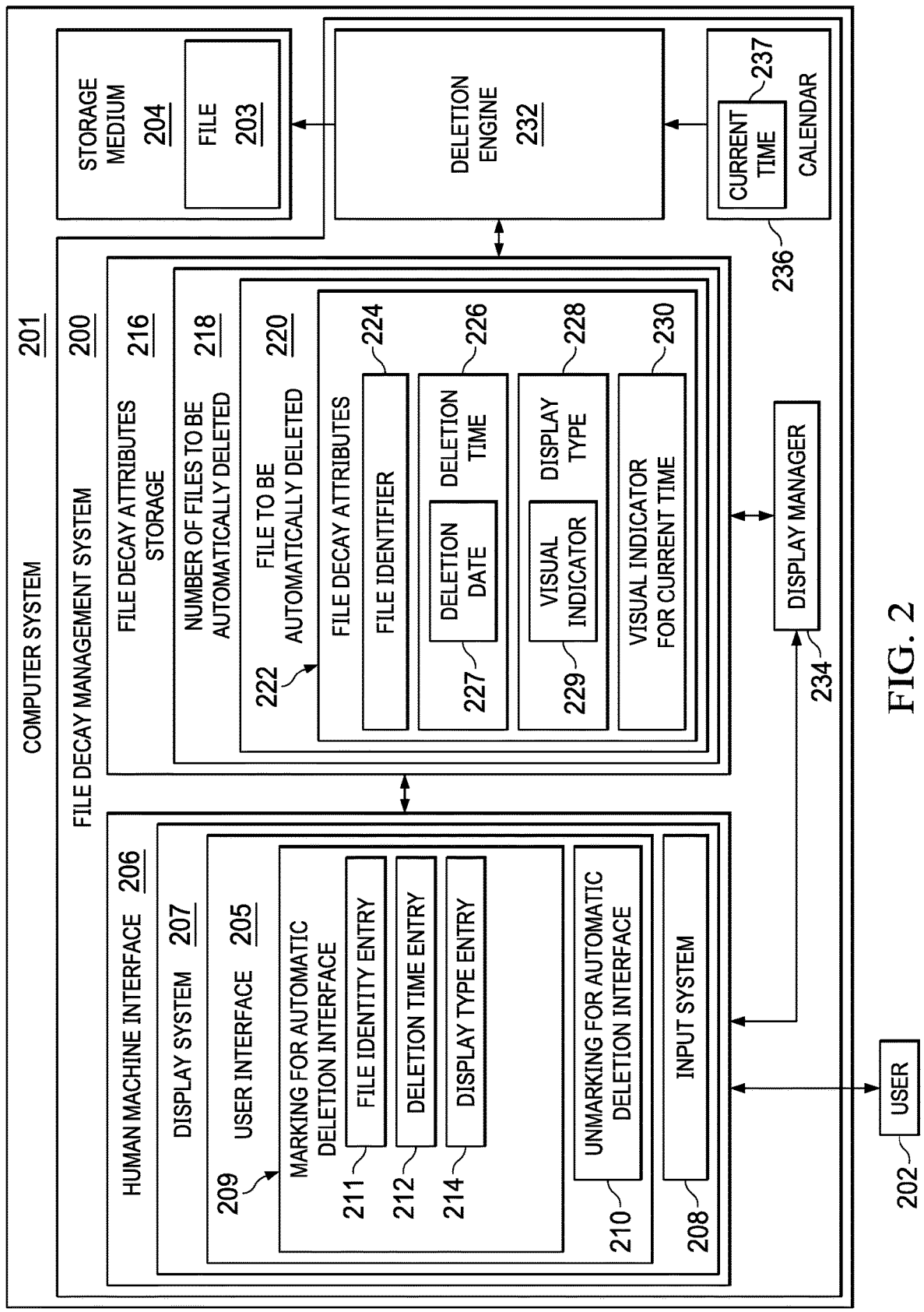
FIG. 2 is a block diagram of a file decay management system (FDMS) depicted in accordance with an illustrative embodiment.

Turning now to FIG. 2, a block diagram of a file decay management system (FDMS) 200 is depicted in accordance with an illustrative embodiment. FDMS 200 is implemented in computer system 201. Computer system 201 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, smart glasses, a mobile phone, or some other suitable data processing system. FDMS 200 may be implemented on, for example, any of client devices 110 or server computers 104, 106 depicted in FIG. 1. In an embodiment, FDMS 200 may be implemented in a distributed computing environment in which some of the components of FDMS 200 are executed on server computer 104 while other components of FDMS 200 are executed on one of client devices 110.

FDMS 200 provides a system for allowing a user 202 to manage the deletion of a file 203 from a storage medium 204. The file 203 may include any electronic content that is intended to be used in either an electronic form or as printed output. For example, without limitation, the file 203 may be referred to as an electronic file, a computer file, an electronic document, or using other appropriate terms.

The storage medium 204 may include any appropriate medium or device on which the file 203 may be stored and from which the file 203 may be deleted. For example, without limitation, storage medium 204 may include storage devices 1016 or computer readable media 1020 as described in more detail below with reference to FIG. 10.

In accordance with an illustrative embodiment, the FDMS 200 is configured to allow the user 202 to delete the file 203 from the storage medium 204 immediately or to designate the file 203 for automatic deletion from the storage medium 204 after a specified time period. The FDMS 200 also provides a visual indicator of the nearness of the automatic deletion time for the file 203 and enables the user 202 to modify the automatic deletion time for the file 203 or to mark the file 203 to not be automatically deleted, if the user 202 changes their mind about deleting the file 203 before the automatic deletion time. The functionality provided by the FDMS 200 enables the user 202 to reduce the number of unneeded files on their computer in an effective and efficient manner, so that the user 202 is not overwhelmed with too much clutter on the display when looking for a particular file, and so that the storage for the computer does not become loaded with files that are no longer needed, and thus more storage space is available for files that are needed.

As depicted, FDMS 200 includes a user interface 205, a file decay attributes storage 216, a deletion engine 232, a display manager 234, and a calendar 236.

In this illustrative example, the user interface 205 can be in the form of a graphical user interface. As depicted, the user interface 205 can be implemented in human machine interface (HMI) 206. HMI 206 is a hardware system that includes display system 207 and input system 208. Display system 207 is a physical hardware system and includes one or more display devices on which user interface 205 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

The user 202 is a person that can interact with the user interface 205 through user input generated by the input system 208. The input system 208 is a physical hardware system and can be selected from at least one of a mouse, a keyboard, a trackball, a touchscreen, a stylus, a motion sensing input device, a gesture detection device, a cyber glove, or some other suitable type of input device.

In an illustrative embodiment, the user interface 205 may be accessed and engaged by, for example, the user 202 using the input system 208 to right click on or otherwise select a visual indicator displayed on the display system 207 for the file 203 which the user 202 wishes to have marked for automatic deletion or unmarked to not be automatically deleted. In this illustrative example, the user interface 205 includes a marking for automatic deletion interface 209 and an unmarking for automatic deletion interface 210.

The marking for automatic deletion interface 209 is configured to allow the user 202 to designate the file 203 for automatic deletion. The marking for automatic deletion interface 209 also is configured to allow the user 202 to specify details for the automatic deletion of the file 203.

In an illustrative embodiment, the marking for automatic deletion interface 209 includes a file identity entry 211, a deletion time entry 212, and a display type entry 214. The file identity entry 211 is configured to allow the user 202 to identify the file 203 to be automatically deleted in any appropriate manner.

The deletion time entry 212 is configured to allow the user 202 to identify a deletion time for the automatic deletion of the file 203 from the storage medium 204 in any appropriate manner. For example, the deletion time entry 212 may be configured to allow the operator 202 to identify the deletion time by indicating a specific date for automatically deleting the file 203. Alternatively, the deletion time entry 212 may be configured to allow the operator 202 to identify the deletion time by entering a length of time from the current time, such as, for example, without limitation, a number of days from the current date, for automatically deleting the file 203.

The display type entry 214 may be configured to allow the user 202 to specify the type of visual indicator that will be used to indicate that the file 203 is marked for automatic deletion. The display type entry 214 also may be configured to allow the user 202 to specify how the visual indicator will change over time to indicate the nearness of the deletion time.

The unmarking for automatic deletion interface 210 is configured to allow the user 202 to mark the file 203 to not be automatically deleted. The user 203 may use the unmarking for automatic deletion interface 210 to prevent the file 203 from being automatically deleted at any time before the file 203 is automatically deleted from the storage medium 204.

The file decay attributes storage 216 includes file decay attributes 222 for each file to be automatically deleted 220 in a number of files to be automatically deleted 218. The number of files to be automatically deleted 218 and the file decay attributes 222 for each file to be automatically deleted 220 in the number of files to be automatically deleted 218 may be identified by the user 202 using the marking for automatic deletion interface 209.

The file decay attributes 222 for each file to be automatically deleted 220 may include a file identifier 224, a deletion time 226, a display type 228, and a visual indicator for current time 230. The file identifier 224 may identify the file to be automatically deleted 220 in any appropriate manner. For example, without limitation, the file identifier 224 may identify the location in the storage medium 204 of the file to be automatically deleted.

The deletion time 226 may identify the time for automatic deletion of the file to be automatically deleted 220 in any appropriate manner. For example, without limitation, deletion time 226 may be a deletion date 227 for automatic deletion of the file to be automatically deleted 220.

The display type 228 indicates how a visual indicator 229 for the file to be automatically deleted 220 is displayed to the user 202 on the display system 207 to indicate that the file is marked for automatic deletion. For example, the visual indicator 229 may include alphanumeric text, such as the name of the file to be automatically deleted 220, a graphical icon, another appropriate visual indicator, or a combination of alphanumeric text and graphics. The display type 228 also may indicate how the visual indicator 229 for the file to be automatically deleted 220 changes over time as the deletion time 226 for automatic deletion of the file to be automatically deleted 220 nears. The changing visual indicator 229 for the file to be automatically deleted 220 reminds the user 202 that the file is marked for automatic deletion and indicates how soon the file will be automatically deleted. The user 202 then has the opportunity to unmark the file for automatic deletion, if desired, so the file will not be automatically deleted.

For example, without limitation, the display type 228 may indicate that the visual indicator 229 for the file to be automatically deleted 220 becomes more transparent as the deletion time 226 for automatic deletion of the file to be automatically deleted 220 approaches. The transparency of the visual indicator 229 for the file to be automatically deleted 220 may be defined relative to the typical visual indicator for a file that is not marked for automatic deletion. For example, a visual indicator 229 for the file to be automatically deleted 220 that is 0% transparent is completely visible to the same extent as other visual indicators for files that are not marked for automatic deletion. A visual indicator 229 for the file to be automatically deleted 220 that is 80% transparent is almost invisible, although still visible. For example, without limitation, the percentage of transparency of the visual indicator 229 may indicate the percentage of pixels of a visual indicator 229 that is 0% transparent that are replaced by the corresponding pixels of the background immediately behind the visual indicator 229. The desired level of transparency of the visual indicator 229 may be implemented in any other appropriate manner.

The display type 228 may define any appropriate relationship between the transparency of the visual indicator 229 for the file to be automatically deleted 220 and the amount of time until the deletion time 226 for automatic deletion of the file to be automatically deleted 220. For example, the visual indicator 229 for the file to be automatically deleted 220 may be 0% transparent until a decay start time is reached. For example, without limitation, the decay start time may be a fixed number of days before the deletion time 226 for the file to be automatically deleted 220, a number of days before the deletion time 226 that is selectable by the user 202, or any other appropriate amount of time before the deletion time 226. Starting at the decay start time, the transparency of the visual indicator 229 for the file to be automatically deleted 220 may be increased from 0% transparency at an appropriate rate to indicate that the deletion time 226 for automatic deletion of the file to be automatically deleted 220 is approaching. For example, starting at the decay start time, the transparency of the visual indicator 229 may be increased linearly, exponentially, or in any other appropriate manner.

The transparency of the visual indicator 229 may be described in terms of opacity. Opacity is the opposite of transparency. For example, visual indicator 229 with 0% transparency may be described as 100% opaque. Visual indicator 229 with 80% transparency may be described as 20% opaque. Therefore, in accordance with an illustrative embodiment, the display type 228 may indicate that the visual indicator 229 for the file to be automatically deleted 220 becomes less opaque as the deletion time 226 for automatic deletion of the file to be automatically deleted 220 approaches.

As another example, the display type 228 may indicate that the color of the visual indicator 229 for the file to be automatically deleted 220 changes as the deletion time 226 for automatic deletion of the file to be automatically deleted 220 approaches. For example, without limitation, the display type 228 may indicate that the color of the visual indicator 229 for the file to be automatically deleted 220 changes over time, from, for example, green, to yellow, to red, as the deletion time 226 for automatic deletion of the file to be automatically deleted 220 becomes closer.

The visual indicator for current time 230 indicates how the visual indicator 229 for the file to be automatically deleted 220 is currently to be displayed on the display system 207. The visual indicator for current time 230 is determined based on the current time, how near the current time is to the deletion time 226 for automatically deleting the file to be automatically deleted 220, and the display type 228 indicating how the proximity of the current time to the deletion time 226 is to be indicated in the visual indicator 229 for the file to be automatically deleted 220.

The deletion engine 232 is configured to analyze the file decay attributes 222 for the number of files to be automatically deleted 218 identified in the file decay attributes storage 216. The deletion engine 232 is configured to compare the deletion time 226 for each file to be automatically deleted 220 to the current time 237 obtained from a calendar 236 to determine the nearness of the deletion time 226 for each file to be automatically deleted 220. The deletion engine 232 is configured to generate or modify the visual indicator for current time 230 for each file to be automatically deleted 220 according to the determined nearness of the deletion time 226 for the filed to be automatically deleted 220 and in the manner defined by the display type 228 for the file to be automatically deleted 220.

The deletion engine 232 also is configured to delete automatically the file to be automatically deleted 220 from the storage medium 204 in response to the deletion time 226 for the file to be automatically deleted 220 being reached. For example, the deletion time 226 for the file to be automatically deleted 220 may be determined to be reached when the current time 237 is the same as or after the deletion time 226 for the file to be automatically deleted 220. The deletion engine 232 also may remove the file decay attributes 222 for the file to be automatically deleted 220 from the file decay attributes storage 216 when the file to be automatically deleted 220 is deleted from the storage medium 204.

The display manager 234 is configured to control the display of the visual indicator 229 for each file to be automatically deleted 220. Whenever the visual indicator 229 for a file to be automatically deleted 220 is requested or required to be displayed in the display system 207, the display manager 234 ensures that the visual indicator 229 displayed for the file to be automatically deleted 220 is the visual indicator for current time 230, which indicates how close the file to be automatically deleted 220 is to being deleted.

The illustration of file decay management system 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
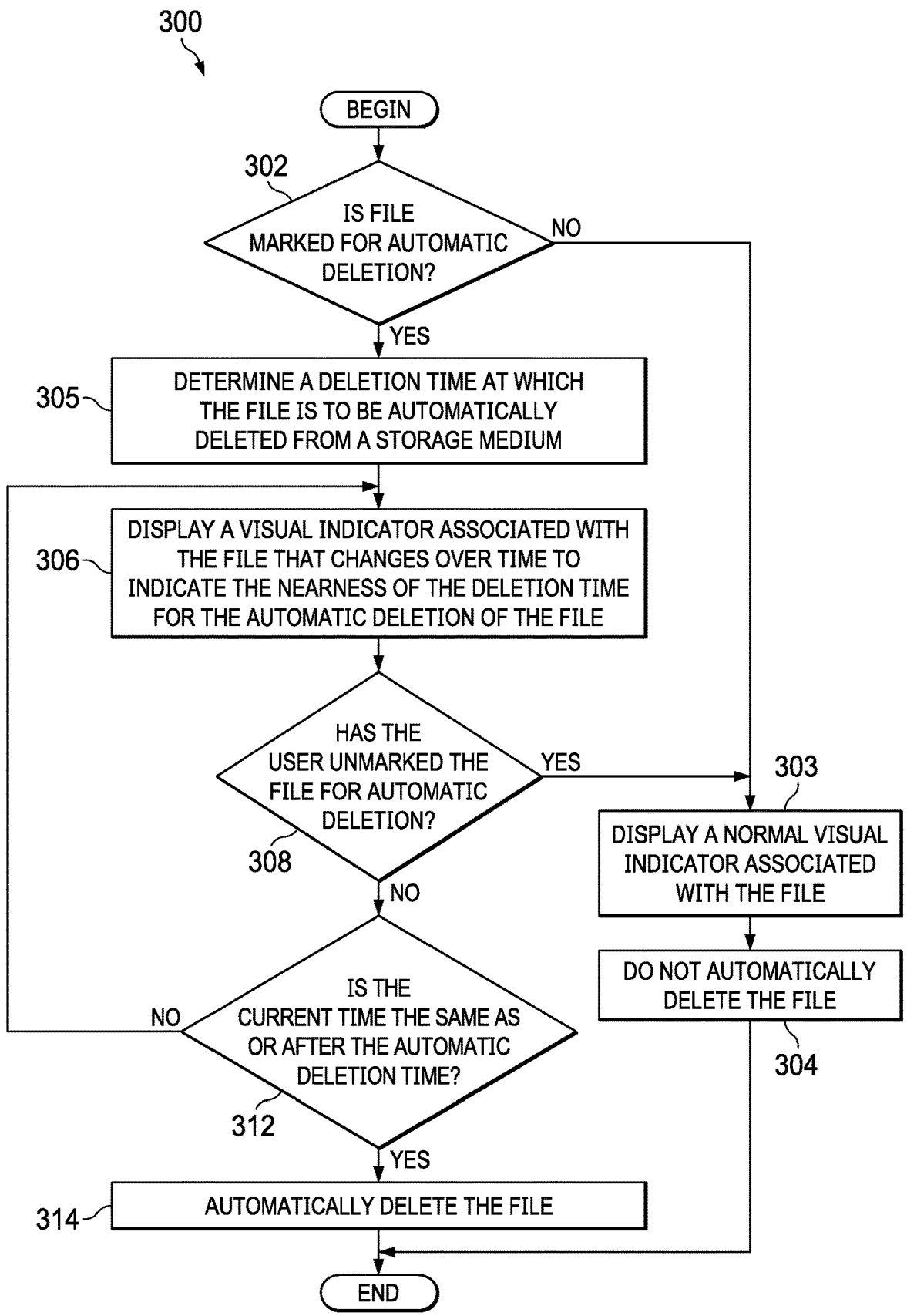
FIG. 3 is a flowchart of a method for file decay management depicted in accordance with an illustrative embodiment.

Turning now to FIG. 3, a flowchart of a method 300 for file decay management is depicted in accordance with an illustrative embodiment. The method 300 may be implemented, for example, in file decay management system 200 in FIG. 2.

The method 300 begins by determining if a file is marked for automatic deletion (step 302). If the file is not marked for automatic deletion, a normal visual indicator associated with the file may be displayed (step 303) and the file is not automatically deleted (step 304), with the method 300 ending thereafter.

In response to a determination at step 302 that the file is marked for automatic deletion, a deletion time at which the file is to be deleted automatically from a storage medium is determined (step 305). The deletion time may be user selectable. Alternatively, the deletion time may be set automatically to a predefined value in respond to the user designating the file to be deleted automatically.

The method 300 continues by displaying a visual indicator associated with the file that changes over time to indicate the nearness of the deletion time for the file (step 306). The visual indicator displayed in step 306 may take a number of different forms, depending on the particular embodiment. For example, the visual indicator may include text, such as a file name for the file, a graphical icon, or both text and graphics as used to identify files in a computer system. The manner in which the visual indicator for the file changes over time as the deletion time for automatic deletion of the file becomes closer also may take a number of different forms. For example, the visual indicator for the file may become more transparent over time as the deletion time gets closer. In another embodiment, the color of the visual indicator may change over time as the deletion time gets closer. For example, the color of the visual indicator for the file may change from green to yellow as the deletion time for the automatic deletion of the file becomes closer. The color of the visual indicator may then change to red when the deletion time for the automatic deletion of the file is very near, for example, without limitation, within the next day. In another embodiment, the shape of the visual indicator may change over time as the deletion time becomes closer. For example, the visual indicator may change from one particular graphical icon to a different graphical icon over time as the deletion time for the automatic deletion of the file becomes closer. The way in which the visual indicator changes over time to indicate the nearness of the deletion time for the automatic deletion of the file may be user selectable.

The method 300 continues by determining whether the user has unmarked the file for automatic deletion (step 308). The file can be unmarked for automatic deletion in step 308 in response to receiving a user input. If the user has unmarked the file for automatic deletion at step 308, the method 300 proceeds to display a normal visual indicator for the file at step 303 and to not automatically delete the file at step 304, with the method 300 ending thereafter.

In response to a determination at step 308 that the user has not unmarked the file for automatic deletion, the method 300 proceeds to determine whether the current time is the same as or after the deletion time for the automatic deletion of the file (step 312). In response to a determination at step 312 that the deletion time has been reached, the file is automatically deleted from the storage medium (step 314), after which the method 300 may end. In response to a determination at operation 312 that the deletion time has not yet been reached, the method 300 may return to step 306, such that the visual indicator for the file changes to indicate the nearness of the deletion time for the automatic deletion of the file until the file is either automatically deleted or unmarked for automatic deletion.

Figure 4:
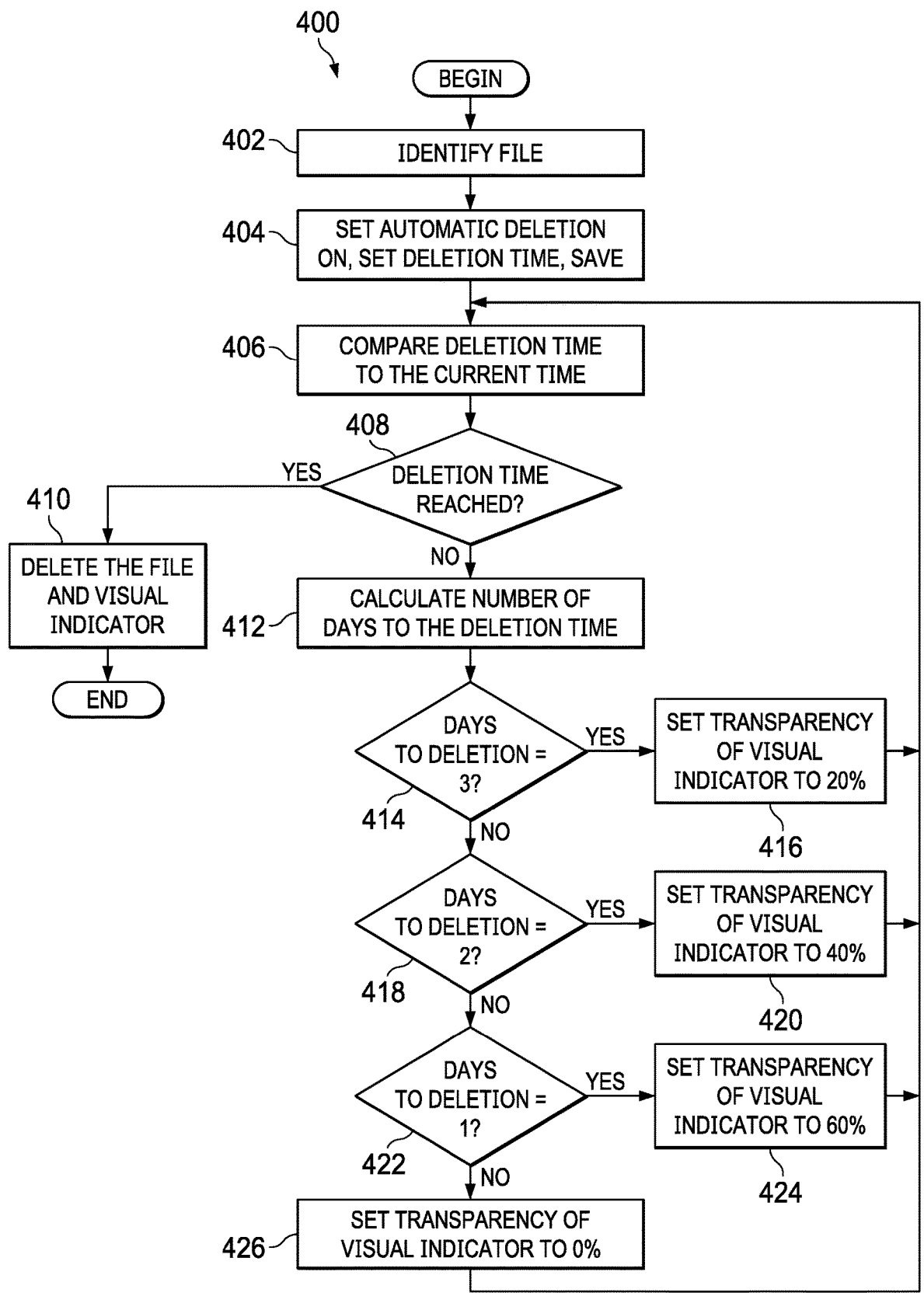
FIG. 4 is a flowchart of another method for file decay management depicted in accordance with an illustrative embodiment.

Turning now to FIG. 4, a flowchart of another method 400 for file decay management is depicted in accordance with an illustrative embodiment. The method 400 is an example of one possible implementation of portions of the method 300 in FIG. 3. The method 400 may be implemented, for example, in file decay management system 200 in FIG. 2.

The method 400 begins by identifying a file in a storage medium (step 402). A user then may mark the file for automatic deletion, set a deletion time for the automatic deletion of the file, and save the deletion time and other file decay attributes for the file to be automatically deleted (step 404). The deletion time for the automatic deletion of the file then may be compared to the current time (step 406) to determine whether the deletion time for the automatic deletion of the file has been reached (step 408). In response to a determination at step 408 that the deletion time has been reached, the file is automatically deleted from the storage medium and a visual indicator associated with the file is no longer displayed (step 410), with the method 400 ending thereafter.

In response to a determination at step 408 that the deletion time for the automatic deletion of the file has not been reached, the method 400 may proceed to calculate the number of days from the current time to the deletion time (step 412). The method 400 then may determine whether the number of days to the deletion time is three days (step 414). If the number of days to the deletion time is determined to be three days at step 414, the method 400 may set the transparency of the visual indicator associated with the file to 20% transparency (step 416), with the method 400 returning to step 406 thereafter. If the number of days to the deletion time is not determined to be three days at step 414, the method 400 may determine whether the number of days to the deletion time is two days (step 418). If the number of days to the deletion time is determined to be two days at step 418, the method 400 may set the transparency of the visual indicator associated with the file to 40% transparency (step 420), with the method 400 returning to step 406 thereafter. If the number of days to the deletion time is not determined to be two days at step 418, the method 400 may determine whether the number of days to the deletion time is one day (step 422). If the number of days to the deletion time is determined to be one day at step 422, the method 400 may set the transparency of the visual indicator associated with the file to 60% transparency (step 424), with the method 400 returning to step 406 thereafter. If the number of days to the deletion time is not determined to be one day at step 422, the method 400 may set the transparency of the visual indicator associated with the file to 0% transparency (step 426), with the method 400 returning to step 406 thereafter.

Turning now to FIGS. 5-9, displays 500, 600, 700, 800, and 900 are examples of displays illustrating the changing appearance of a visual indicator for a file to be automatically deleted as the deletion time for the automatic deletion of the file approaches in accordance with an illustrative embodiment. Displays 500, 600, 700, 800, and 900 are examples of displays that can be displayed in human machine interface 206, in particular in user interface 205 on display system 207, in file decay management system 200 in FIG. 2.

Figure 5:
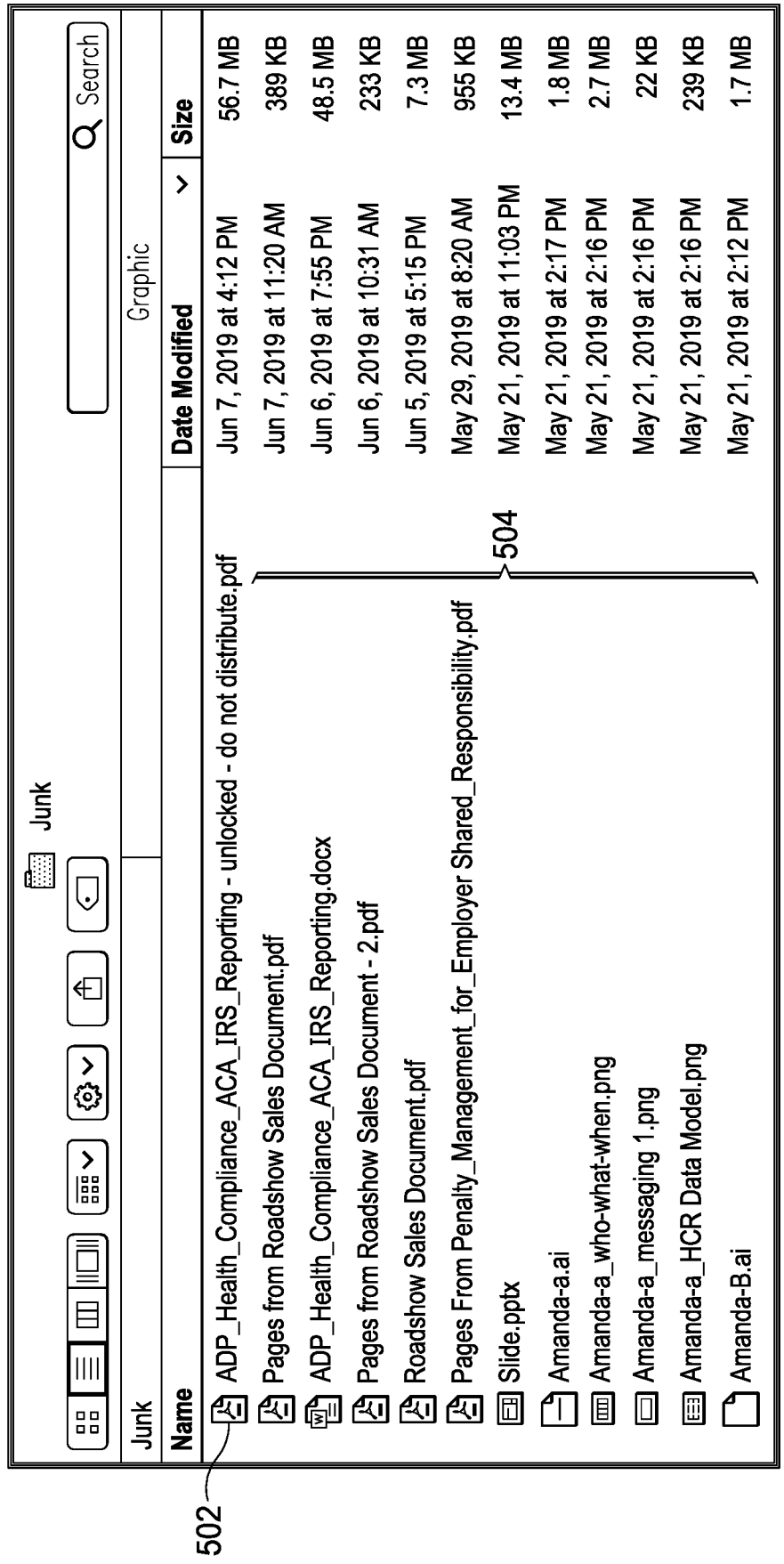
Figure 7:
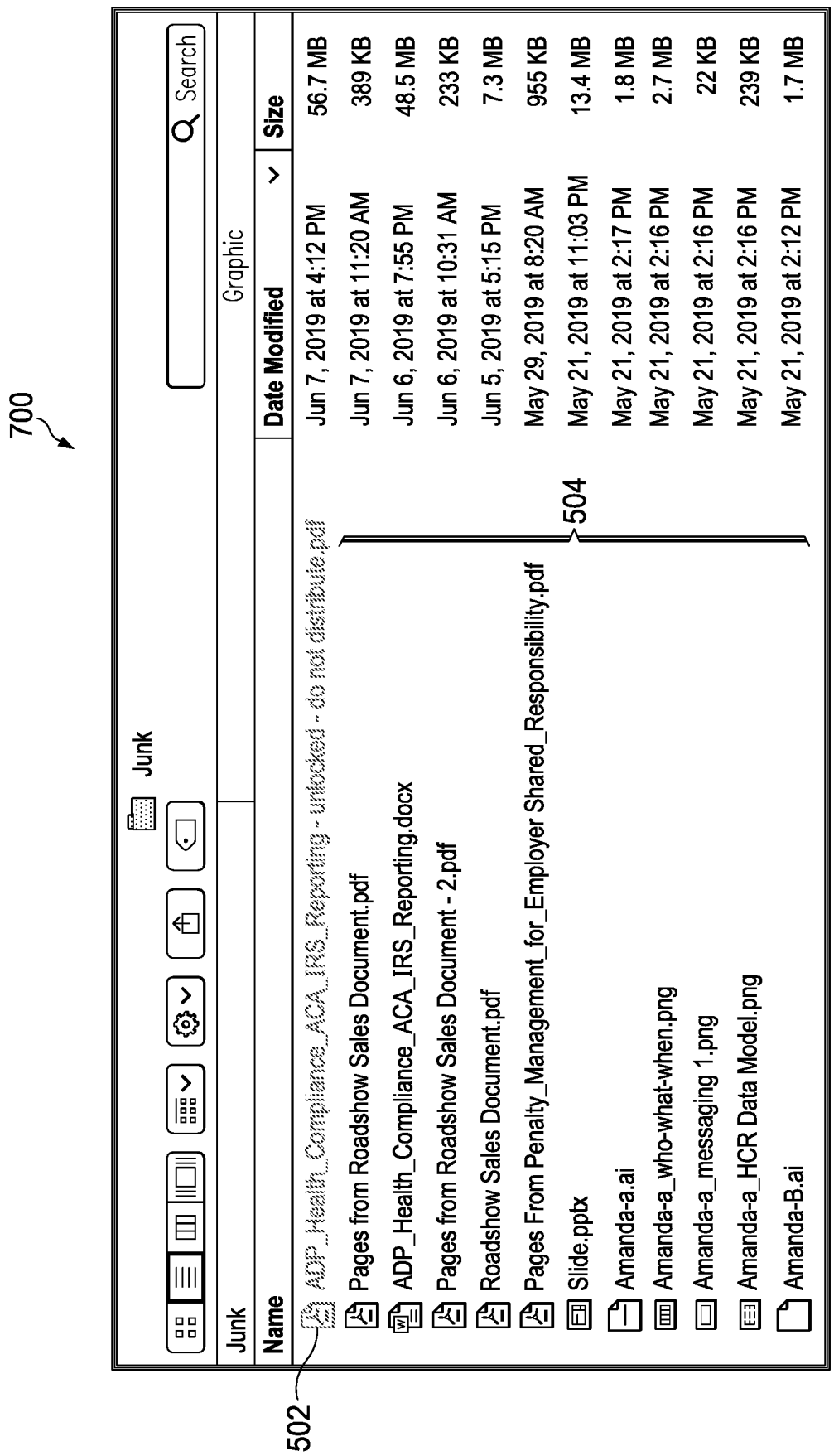
Figure 8:
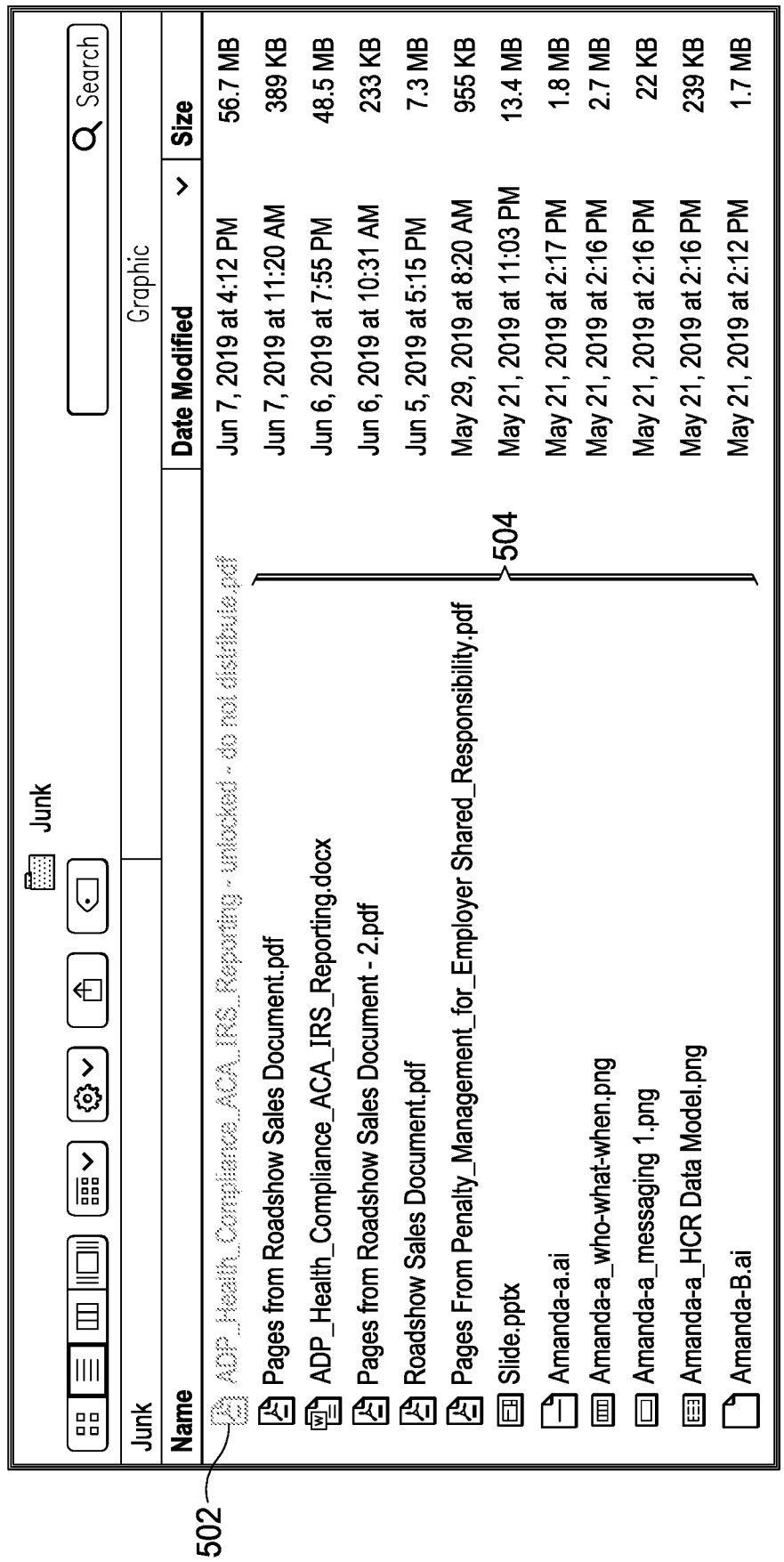

In display 500 in FIG. 5, a visual indicator 502 for a file with the file name "ADP_Health_Compliance_ACA_IRS_Reporting-unlocked-do not distribute.pdf" is displayed in a normal manner, in the same manner as the visual indicators 504 for other files. This indicates that the file is not designated for automatic deletion in accordance with an illustrative embodiment or that the deletion time for the automatic deletion of the file is relatively far in the future. In display 600 in FIG. 6, the deletion time for the automatic deletion of the file indicated by the visual indicator 502 is three days away. In this example, the visual indicator 502 for the file to be deleted is displayed in display 600 at 20% transparency. In display 700 in FIG. 7, the deletion time for the automatic deletion of the file indicated by the visual indicator 502 is two days away. In this example, the visual indicator 502 for the file to be deleted is displayed in display 700 at 40% transparency. In display 800 in FIG. 8, the deletion time for the automatic deletion of the file indicated by the visual indicator 502 is one day away. In this example, the visual indicator 502 for the file to be deleted is displayed in display 800 at 60% transparency. In display 900 in FIG. 9, the deletion time for the automatic deletion of the file indicated by the visual indicator 502 in displays 500, 600, 700, and 800 has been reached. In this example, the file has been automatically deleted and no visual indicator for the file is displayed in display 900.

Figure 10:
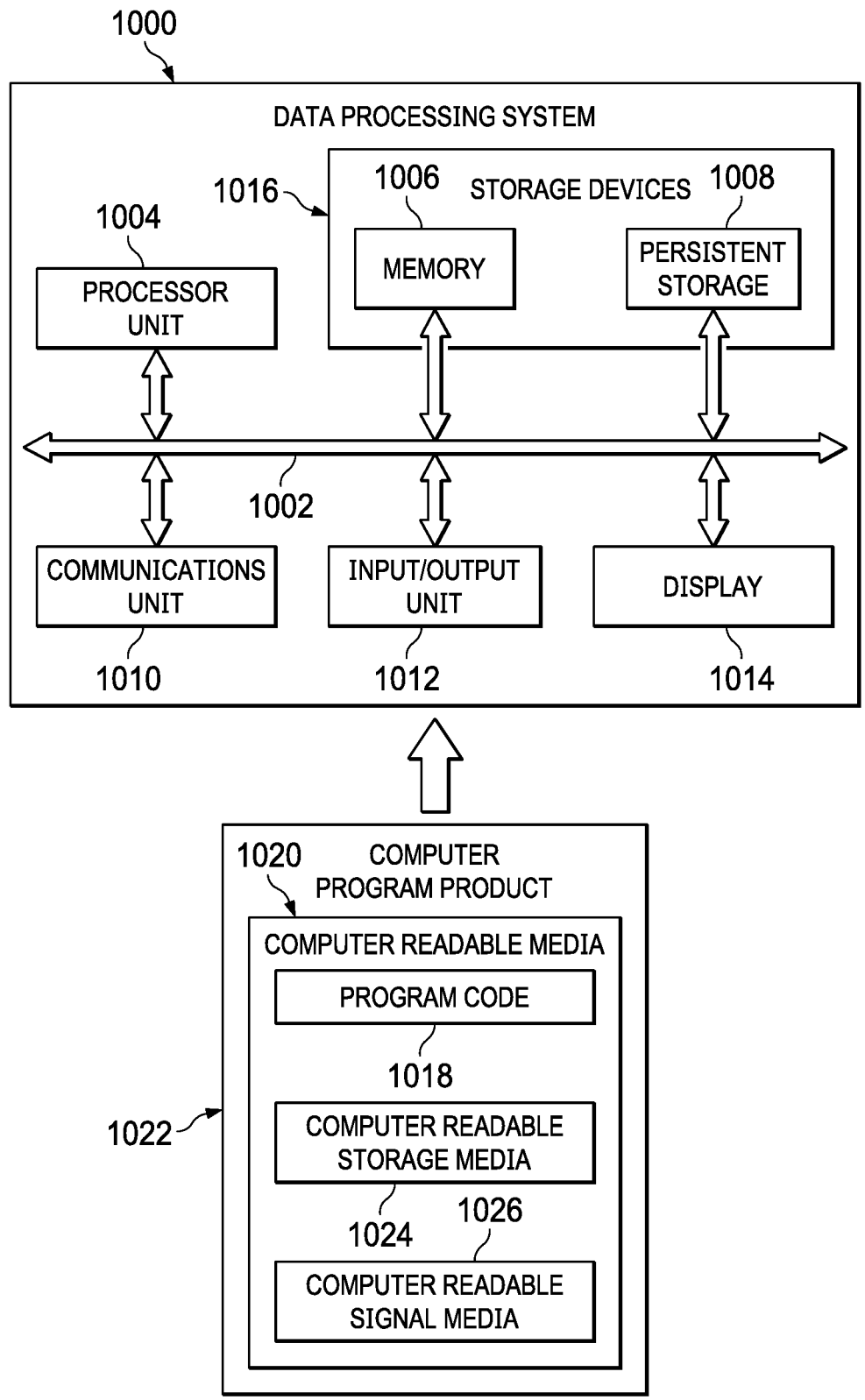
FIG. 10 is a block diagram of a data processing system in accordance with an illustrative embodiment.

Turning now to FIG. 10, an illustration of a block diagram of a data processing system 1000 is depicted in accordance with an illustrative embodiment. Data processing system 1000 is an example of computer system 201 on which file decay management system 200 in FIG. 2 may be implemented.

In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general purpose central processing units (CPUs). In an alternate embodiment, processor unit 1004 comprises one or more graphical processing units (CPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 1020" can be singular or plural. For example, program code 1018 can be located in computer-readable media 1020 in the form of a single storage device or system. In another example, program code 1018 can be located in computer-readable media 1020 that is distributed in multiple data processing systems. In other words, some instructions in program code 1018 can be located in one data processing system while other instructions in program code 1018 can be located in another data processing system. For example, a portion of program code 1018 can be located in computer-readable media 1020 in a server computer while another portion of program code 1018 can be located in computer-readable media 1020 located in a set of client computers.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added to the illustrated blocks in a flowchart or block diagram.

The description of the different illustrative embodiments has been presented for purposes of illustration and description and is not intended to be exhaustive or to limit the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for deleting a file from a storage medium, comprising:
identifying, by a computer system, the file that is marked for automatic deletion;
identifying, by the computer system, a deletion time at which the file is to be automatically deleted from the storage medium; and
displaying, by the computer system, a visual indicator associated with the file, wherein the visual indicator becomes more transparent over time as the deletion time gets closer, wherein the visual indicator has a transparency of 20% three days before the deletion time, a transparency of 40% two days before the deletion time, and a transparency of 60% one day before the deletion time.

2. The method of claim 1 further comprising:
automatically deleting the file from the storage medium in response to the deletion time being reached.

3. The method of claim 1, further comprising:
responsive to input from a user, unmarking the file for automatic deletion by the computer system;
refraining from automatically deleting the file that is unmarked for automatic deletion; and
displaying the visual indicator associated with the file that is unmarked for automatic deletion with no transparency.

4. The method of claim 1, wherein a color of the visual indicator changes over time.

5. The method of claim 4, wherein the color of the visual indicator changes from green to yellow to red as the deletion time becomes closer.

6. The method of claim 1, wherein a type of the visual indicator is selectable by a user.

7. The method of claim 1, wherein the deletion time is selectable by a user.

8. The method of claim 1, wherein the visual indicator comprises at least one of an icon and a file name.

9. A computer system for automatically deleting a file, the computer system comprising:
a storage medium configured to store the file;
a display system; and
a processor unit configured to:
identify the file stored in the storage medium that is marked for automatic deletion,
identify a deletion time at which the file is to be automatically deleted from the storage medium, and
display a visual indicator associated with the file on the display system, wherein the visual indicator becomes more transparent over time as the deletion time gets closer, wherein the visual indicator has a transparency of 20% three days before the deletion time, a transparency of 40% two days before the deletion time, and a transparency of 60% one day before the deletion time.

10. The computer system of claim 9, wherein the processor unit is further configured to automatically delete the file from the storage medium in response to the deletion time being reached.

11. The computer system of claim 9, wherein the processor unit is further configured to:
responsive to input from a user, unmark the file for automatic deletion;
refrain from automatically deleting the file that is unmarked for automatic deletion; and
display the visual indicator associated with the file that is unmarked for automatic deletion with no transparency.

12. The computer system of claim 9, wherein a color of the visual indicator changes over time.

13. The computer system of claim 12, wherein the color of the visual indicator changes from green to yellow to red as the deletion time becomes closer.

14. The computer system of claim 9, wherein a type of the visual indicator is selectable by a user.

15. The computer system of claim 9, wherein the deletion time is selectable by a user.

16. The computer system of claim 9, wherein the visual indicator comprises at least one of an icon and a file name.

17. A computer program product for automatically deleting a file, the computer program product comprising a computer readable storage media having program instructions embodied therewith, the program instructions executable by a computer to cause the computer to perform a method comprising:
identifying a file that is marked for automatic deletion from a storage medium;
identifying a deletion time at which the file is to be automatically deleted from the storage medium; and
displaying a visual indicator associated with the file, wherein the visual indicator changes over time to provide an indication of a nearness of the deletion time becomes more transparent over time as the deletion time gets closer, wherein the visual indicator has a transparency of 20% three days before the deletion time, a transparency of 40% two days before the deletion time, and a transparency of 60% one day before the deletion time.

18. The computer program product of claim 17, wherein the program instructions are executable by the computer to cause the computer to automatically delete the file from the storage medium in response to the deletion time being reached.

19. The computer program product of claim 17, wherein the program instructions are executable by the computer to cause the computer to:
- responsive to input from a user, unmark the file for automatic deletion;
- refrain from automatically deleting the file that is unmarked for automatic deletion; and
- display the visual indicator associated with the file that is unmarked for automatic deletion with no transparency.

20. The computer program product of claim 17, wherein a color of the visual indicator changes from green to yellow to red as the deletion time becomes closer.

* * * * *